A. W. DANIELS.
CULTIVATOR AND PLOW ATTACHMENT.
APPLICATION FILED AUG. 10, 1912.
1,074,166.  Patented Sept. 30, 1913.
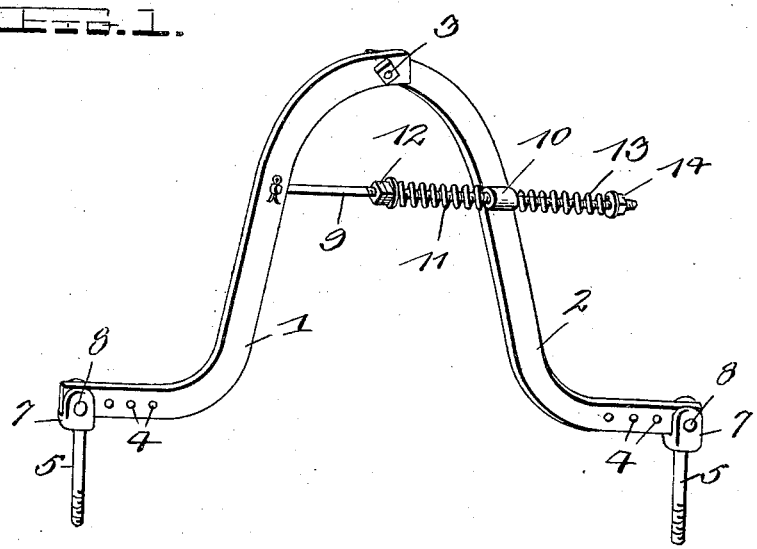
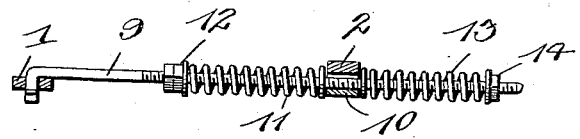
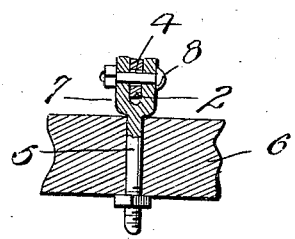
Inventor
A. W. Daniels,
Witnesses
By Watson E. Coleman
Attorney

UNITED STATES PATENT OFFICE.

ADELBERT W. DANIELS, OF MORRISON, ILLINOIS.

CULTIVATOR AND PLOW ATTACHMENT.

1,074,166.  Specification of Letters Patent.  Patented Sept. 30, 1913.

Application filed August 10, 1912. Serial No. 714,426.

*To all whom it may concern:*

Be it known that I, ADELBERT W. DANIELS, a citizen of the United States, residing at Morrison, in the county of Whiteside and State of Illinois, have invented certain new and useful Improvements in Cultivator and Plow Attachments, of which the following is a specification, reference being had to the accompanying drawings.

My invention relates to new and useful improvements in plow and cultivator attachments and has for its object to provide an improved arch therefor which is capable of adjustment to admit the beams to be correspondingly adjusted with respect to one another.

A further object of the invention resides in providing an arch formed of a pair of members pivoted one to the other at their upper ends and a still further object resides in providing means to retain the sections of said arch in various adjusted positions with respect to one another.

A still further object of the invention resides in providing a device which is extremely simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claim.

In the accompanying drawing forming a part of this application, Figure 1 is a perspective view of my improved arch. Fig. 2 is a horizontal section therethrough. Fig. 3 is a detail view.

In describing my invention, I shall refer to the drawing in which similar reference characters designate corresponding parts throughout the several views and in which 1 and 2 indicate a pair of arch members pivoted one to the other at their upper ends, as shown at 3 to provide a complete arch adapted for use on a cultivator or plow. The free ends of the arch members 1 and 2 are bent laterally and provided with a plurality of openings 4 to admit of the arms 5 being adjustably engaged therewith and these arms 5 are secured in any preferred manner to the beams 6. These arms 5 have the upper ends thereof provided with yokes or the like 7 which are adapted to receive therein the laterally extending ends of the arch members 1 and 2 and bolts 8 are adapted to be extended through the yoke like portions of the arms and through the openings in the ends of said arch members to securely retain said arms in position on the arch.

My invention contemplates the provision of means for the adjustment of the arch and means for the retention of the same in any adjusted position and to this end, a rod or bar 9 is pivoted at its one end to the arch member 1, adjacent its upper end and loosely extended through a keeper or the like 10 mounted on the opposite arch member 2. This rod or bar 9 is threaded for the greater portion of its length and encircling the same between the keeper 10 and the member 1 is a coil spring 11, the tension of the same being capable of adjustment by means of a nut 12, mounted on the threaded portion of the rod 9. Also encircling the rod 9 between the keeper 10 and the free end of said rod is an additional coil spring 13, the tension of which is capable of adjustment by means of an additional nut 14 engaged with the free end of said rod.

From this description of the construction of my device, it will be appreciated that the arch members 1 and 2 may be readily adjusted with respect to one another by adjusting the tension of the springs 11 and 13 through the medium of the nuts 12 and 14 respectively and this adjustment will correspondingly adjust the position of the beams 6 with respect to one another. It will, of course, be further understood that said beams may be also adjusted with respect to one another through the medium of the adjustable arms 5. In addition to forming a means whereby the arch members 1 and 2 may be adjusted with respect to one another, these springs 11 and 13 permit the arch members to be spread or contracted, as the case may be, as the plow points (not shown) on the beams strike obstructions in the path of travel thereof.

From the foregoing, it will be seen that I have provided a device which is extremely simple and durable in construction, inexpensive to manufacture and one which will be very efficient and useful in operation.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

The combination with a pair of arch members pivotally united at their upper terminals, horizontal arms formed at the lower ends of the arch members, a guide formed intermediate one of the arch members, a threaded rod passing therethrough, stops adjustable upon said rod upon the opposite sides of one of the arch members, springs disposed upon the rod and engaging the stops and guide carried by one of the arch members, the opposite end of the rod being offset and extended through an opening provided intermediate the ends of the opposing arch member, and fastening means extended through the offset portion of the rod, the said rod and springs being spaced below the pivotal point of the arch member.

In testimony whereof I hereunto affix my signature in the presence of two witnesses.

ADELBERT W. DANIELS.

Witnesses:
E. M. FELLOWS,
S. M. McCOLMONT.

---

Copies of this patent may be obtained for five cents each, by addressing the "Commissioner of Patents, Washington, D. C."